(12) United States Patent
Yang et al.

(10) Patent No.: US 11,890,701 B2
(45) Date of Patent: Feb. 6, 2024

(54) RESISTANCE SPOT WELDING ELECTRODE CAP

(71) Applicant: Shanghai Institute of Optics and Fine Mechanics, Chinese Academy of Sciences, Shanghai (CN)

(72) Inventors: Shanglu Yang, Shanghai (CN); Yanjun Wang, Shanghai (CN); Wu Tao, Shanghai (CN)

(73) Assignee: SHANGHAI INSTITUTE OF OPTICS AND FINE MECHANICS, CHINESE ACADEMY OF SCIENCES, Shanghai (CN)

( * ) Notice: Subject to any disclaimer, the term of this patent is extended or adjusted under 35 U.S.C. 154(b) by 776 days.

(21) Appl. No.: 17/046,830

(22) PCT Filed: Dec. 18, 2018

(86) PCT No.: PCT/CN2018/121780
§ 371 (c)(1),
(2) Date: Oct. 12, 2020

(87) PCT Pub. No.: WO2019/196494
PCT Pub. Date: Oct. 17, 2019

(65) Prior Publication Data
US 2021/0146484 A1 May 20, 2021

(30) Foreign Application Priority Data
Apr. 12, 2018 (CN) .......................... 201810327005.3

(51) Int. Cl.
*B23K 35/02* (2006.01)
*B23K 11/11* (2006.01)
(Continued)

(52) U.S. Cl.
CPC .......... *B23K 35/0205* (2013.01); *B23K 11/11* (2013.01); *B23K 11/3009* (2013.01); *B23K 11/16* (2013.01)

(58) Field of Classification Search
CPC . B23K 35/0205; B23K 11/11; B23K 11/3009; B23K 11/16; B23K 35/02; B23K 11/30
See application file for complete search history.

(56) References Cited

U.S. PATENT DOCUMENTS

| 6,646,221 B2 | 11/2003 | Wang et al. |
| 2003/0192863 A1 | 10/2003 | Wang et al. |
| 2015/0231729 A1 | 8/2015 | Yang et al. |

FOREIGN PATENT DOCUMENTS

| CN | 101927398 A | 12/2010 |
| CN | 104043898 A | 9/2014 |

(Continued)

OTHER PUBLICATIONS

Int'l Search Report dated Mar. 19, 2019 in Int'l Application No. PCT/CN2018/121780.

(Continued)

*Primary Examiner* — Robert G Bachner
(74) *Attorney, Agent, or Firm* — Panitch Schwarze Belisario & Nadel LLP

(57) ABSTRACT

A resistance spot welding electrode cap contains a groove at the center of the welding contact interface. During welding, because of the groove, the area of contact between the electrode cap and a metal workpiece to be soldered is reduced. In the initial stage, the overall heat generation is concentrated on the outer ring of the weld point and heat dissipation becomes slower, helping a weld nugget to form from the outside to the inside. Due to the presence of the groove, the metal workpiece expands toward the groove at the center of the electrode, thereby increasing the size of the weld nugget and reducing splash and deformation. In com- (Continued)

parison with conventional electrode caps, the welding current required to form weld points of the same size is lower, saving on electricity costs, and weld points obtained using the same current have higher strength and stability with fewer welding defects.

15 Claims, 6 Drawing Sheets

(51) Int. Cl.
*B23K 11/30* (2006.01)
*B23K 11/16* (2006.01)

(56) References Cited

FOREIGN PATENT DOCUMENTS

| | | |
|---|---|---|
| CN | 104084686 A | 10/2014 |
| CN | 106736000 A | 5/2017 |
| CN | 107520550 A | 12/2017 |
| JP | 2000288744 A | 10/2000 |
| JP | 2005193298 A | 7/2005 |
| JP | 2015093283 A | 5/2015 |

OTHER PUBLICATIONS

Office Action dated Mar. 31, 2021 in CN Application No. 201810327005.3.
Office Action dated Dec. 14, 2021 in JP Application No. 2021504557.

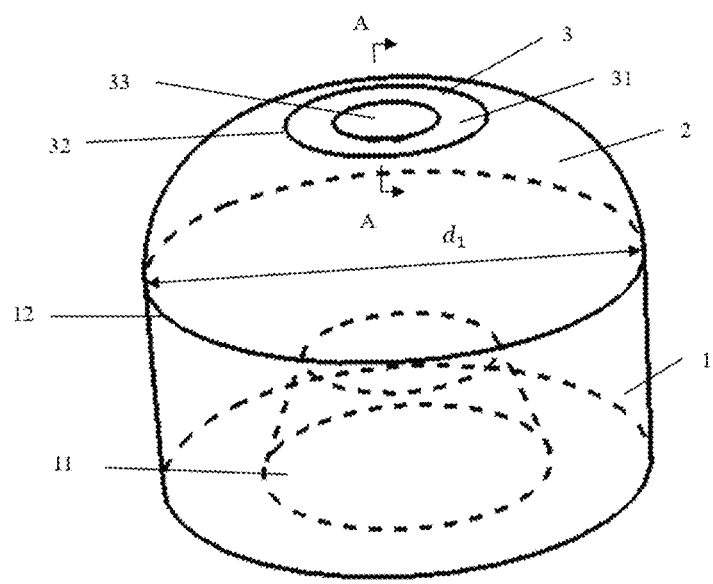
Fig. 1
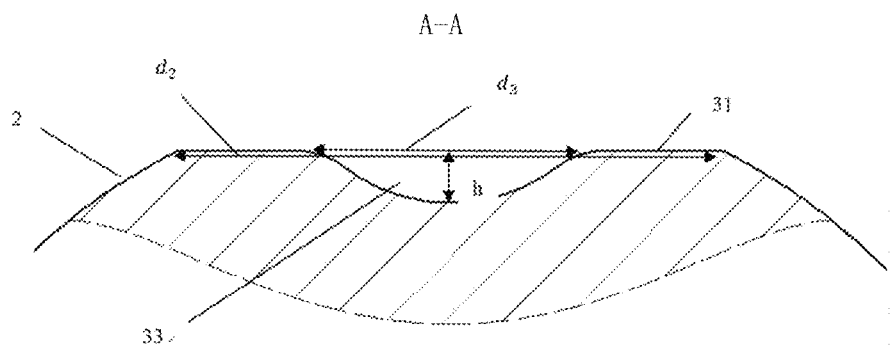
Fig. 2
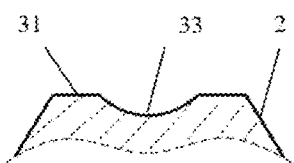 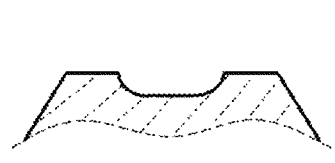 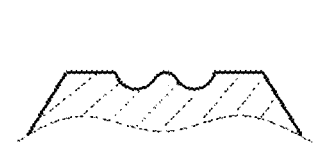
Fig. 3     Fig. 4     Fig. 5
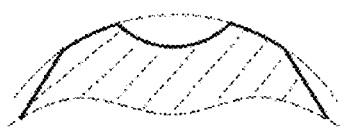 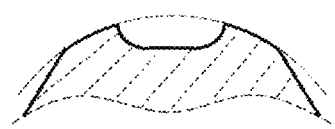 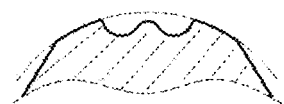
Fig. 6     Fig. 7     Fig. 8

RESISTANCE SPOT WELDING ELECTRODE CAP

CROSS-REFERENCE TO RELATED APPLICATIONS

This application is a Section 371 of International Application No. PCT/CN2018/121780, filed Dec. 18, 2018, which was published in the Chinese language on Oct. 17, 2019, under International Publication No. WO 2019/196494 A1, which claims priority under 35 U.S.C. § 119(b) to Chinese Application No. 201810327005.3, filed Apr. 12, 2018, the disclosures of each of which are incorporated herein by reference in their entireties.

TECHNICAL FIELD

The invention relates to the field of resistance spot welding, and more specifically to a welding electrode cap used for resistance spot welding between two or more layers of metal workpieces.

BACKGROUND

With the gradual intensification of global warming and energy depletion, automobile exhaust emissions and energy consumption have become more and more serious. Experiments show that if the mass of car is reduced by half, the fuel consumption will also be reduced by nearly half. Due to the needs of environmental protection and energy saving, lightweight of automobiles has become a trend of world automobile development. Because aluminum alloy materials have the advantages of high strength, light weight, excellent corrosion resistance, and suitable for various forming methods, the structure weight can be reduced by more than 50% by using aluminum alloy instead of steel plate materials for welding, and the aluminum alloy materials are widely used in automobile bodies.

Currently, the joining methods of automobile body aluminum alloy in automobile manufacturing are mainly mechanical joining methods including riveting. Riveting is a method of high cost, has a complicated process, has poor surface quality, and increases body weight. An all-aluminum body or a hybrid body usually requires more than 1,500 rivets. Resistance spot welding uses the heat generated by the resistance of workpieces themselves and therebetween to melt materials to realize the joining. Because it does not require any filling materials during the joining process, it has high production efficiency and is easy to realize automation, so that this method is widely used in automobile body manufacturing, such as engine covers, doors and other parts. With the application of aluminum alloys in automobiles, automobile manufacturers expect to continue using resistance spot welding to join aluminum alloys.

However, due to the physical properties of aluminum alloy itself, there are many problems when it is welded with common spot welding technology. Due to the high electrical conductivity and high thermal conductivity of aluminum alloy, it requires particularly large current and pressure during spot welding. However, with the use of high current and high electrode pressure, high manufacturing costs are required for welding aluminum alloys. Moreover, due to the narrow molding temperature range of aluminum alloy, it causes serious spatter and internal defects during welding, and large welding deformation. The presence of high-resistance oxide film on the surface also causes the welding electrode to wear quickly and the electrode life to be short during the spot welding process, so that the strength of the spot welds is reduced and the surface quality is poor.

Therefore, it is necessary to develop a method for resistance spot welding of aluminum alloy that can achieve higher welding strength, longer electrode life, lower cost, and easier promotion.

SUMMARY

This invention proposes an electrode cap with a groove in the center of a welding contact surface in order to solve the problems of aluminum alloy resistance spot welding such as requiring large welding current, welding spatter, serious defects, relatively low welding strength, unstable welding quality, short electrode life and so on.

To solve the above problems, a technical solution adopted by the present invention is to provide an electrode cap for resistance spot welding, which comprises:
  a cylindrical electrode cap body 1;
  a contact surface 3 with a welding surface 31, a circumference 32, and a groove 33, wherein the groove 33 is located in the center of the contact surface 3, a upper edge of the groove 33 is connected with the welding surface 31, and the circumference 32 is the outer diameter of the welding surface 31;
  a side surface 2 which is a transition area from the electrode cap body 1 to the contact surface 3 and has a shape of an arc surface or a tapered surface;
  wherein an upper surface and a lower surface of the side surface 2 are respectively connected with the contact surface 3 and one end of the electrode cap body 1 in the form of arc or chamfer.

In another preferred embodiment, the shape of the groove 33 is an arc surface as a whole; or a bottom of the groove is a flat surface, and a connecting part of the groove and the welding surface 31 is transitioned by an arc surface or tapered surface; or the middle of the groove is an arc-shaped boss, and a connecting part of the groove and the welding surface (31) is transitioned by an arc surface or tapered surface.

In another preferred embodiment, the shape of the groove is a spherical surface, and its outer diameter $d_3$ is 2-15 mm; preferably, 2-10 mm.

In another preferred embodiment, the groove 33 and the welding surface 31 are connected by an arc or a chamfer.

In another preferred embodiment, the side surface 2 and the welding surface 31 are connected by an arc or chamfer, and the side surface 2 and the electrode cap body 1 are connected by an arc or chamfer.

In another preferred embodiment, when the side surface 2 is an arc surface, the radius of curvature of the arc surface is greater than or equal to the circumferential radius of the electrode cap body 1.

In another preferred embodiment, when the side surface 2 is a tapered surface, the inclination angle of the tapered surface is 0-90°, preferably, 10-80°.

In another preferred embodiment, the groove 33 has a depth h of 0.1-2 mm; or more preferably, 0.1-1.2 mm.

In another preferred embodiment, the radius of curvature of the arc surface of the groove 33 is 1-50 mm, and when a bottom of the groove is a flat surface, the flat surface is a circle with a radius of 0.1-10 mm.

In another preferred embodiment, the welding surface 31 is a ring-shaped plane, or a ring-shaped spherical surface with a center of the sphere and the electrode cap body on the same side, or a ring-shaped spherical surface with a center of the sphere and the electrode cap body on the opposite side, or an upward convex ring-shaped arc surface.

In another preferred embodiment, when the welding surface 31 is a ring-shaped plane, its outer diameter ranges from 2 to 30 mm; preferably, 6 to 20 mm.

In another preferred embodiment, when the welding surface 31 is a ring-shaped spherical surface, the radius of the sphere where the welding surface 31 is located is 10-100 mm.

In another preferred embodiment, when the welding surface 31 is an upward convex ring-shaped arc surface, the radius of curvature of the arc is 1-10 mm, and the vertical distance between the plane where the highest point of the arc surface is located and the plane where the lowest point of the arc surface is located is 0.1-5 mm.

In another preferred embodiment, the electrode cap for resistance spot welding further comprises a ring-shaped ridge 4 located on the welding surface 31 or groove 33, and a cross-sectional shape of the ring-shaped ridge 4 is a straight line, a curve or a combination of a straight line and a curve.

In another preferred embodiment, the electrode cap for resistance spot welding further comprises a slot 43 formed between two adjacent ring-shaped ridges 4.

In another preferred embodiment, the convex height H of the ring-shaped ridge 4 is 20-500 μm.

In another preferred embodiment, the number of ring-shaped ridges 4 is 0-5.

In another preferred embodiment, the distance between two adjacent ring-shaped ridges 4, or the width of the slot 43 is 50-2000 μm.

It should be understood that, in the present invention, each of the technical features specifically described above and below (such as those in the Embodiments) can be combined with each other, thereby constituting new or preferred technical solutions which need not be redundantly specified herein one-by-one.

The mechanism of the present invention is as follows: The welding of two-layer metal workpieces is taken as an example. When welding, under the effects of the pressure of the welding surface with a central groove and the current, firstly the outer sides of the two-layer metal workpieces contact with each other, and the contact parts that are affected by the ring-shaped electrode generate resistance heat so that a ring-shaped molten pool is formed. As the welding time extends and the central areas contact gradually, the ring-shaped molten pool grows toward the center under the effect of heat conduction. Since the center areas of the two metal workpieces corresponding to the groove (inside the spot welds) is small and not in contact with the electrode cap, the heat is concentrated on the outside. As the metal material in the contact areas melts and deforms plastically, it squeezes and expands to the center groove of the electrode, a new contact surface in the center is generated and the resistance heat is generated on the new contact surfaces, so that the ring-shaped molten pool grows toward the ring center, and the contact parts of the two metal materials corresponding to the groove form a nugget, thereby completing the welding.

Technical effects: Due to the presence of the groove, the initial contact area of the electrode cap of the present invention with the metal workpiece is reduced, the overall heat generation is concentrated, and the heat dissipation becomes slower. As the welding proceeds, the contact area becomes larger and the heat dissipation becomes faster. Therefore, compared with ordinary electrode caps, the welding current required to form spot welds of the same size is reduced, power costs is saved, and the electrode life is improved. Furthermore, because the ring-shaped molten pool is formed first, the presence of the central groove makes the ring-shaped molten pool grow from outside to inside, which is contrary to the growth of the ordinary electrode cap molten pool from inside to outside. The metal material in plastic state is squeezed toward the electrode center groove area under the action of pressure and current, so that it is helpful to avoid porosity, spatter and welding deformation at the edge of the spot welds, thereby increasing the diameter of the nugget and improving the strength of spot welds.

When there is a ring-shaped ridge, the ring-shaped ridge can pierce the oxide film on the surface of the aluminum alloy during contact, thereby reducing the contact resistance, increasing the contact area and enhancing heat dissipation, so that the heat of the electrode welding surface and the contact surface of the aluminum alloy plate is reduced, and the service life of the electrode is improved.

BRIEF DESCRIPTION OF DRAWINGS

In order to explain the embodiments of the present invention or the technical solutions in the prior art more clearly, the drawings that need to be used in the description of the embodiments or the prior art are briefly introduced hereinafter. It is apparent that the figures in the following description are only some embodiments of the present invention, and other alternative embodiments can be obtained based on these figures without inventiveness work by those skilled in the art.

FIG. 1 shows a schematic diagram of one electrode cap with a groove in the center of the contact surface.

FIG. 2 shows one embodiment of a cross-sectional view of the A-A section in FIG. 1.

FIG. 3 shows one embodiment of the cross-sectional view of the A-A section in FIG. 1, wherein the welding surface is a ring-shaped plane and the groove is a spherical surface.

FIG. 4 shows one embodiment of the cross-sectional view of the A-A section in FIG. 1 wherein the welding surface is a ring-shaped plane, the bottom of the groove is a flat surface, and the bottom of the groove and the welding surface is transitioned by an arc surface.

FIG. 5 shows one embodiment of the cross-sectional view of the A-A section in FIG. 1 wherein the welding surface is a ring-shaped plane, the middle of the groove is an arc-shaped boss, and the connecting part of the groove and the welding surface is transitioned by an arc surface.

FIG. 6 shows one embodiment of the cross-sectional view of the A-A section in FIG. 1 wherein the welding surface is a ring-shaped spherical surface with the center of the sphere and the electrode cap body on the same side, and the groove is a spherical surface.

FIG. 7 shows one embodiment of the cross-sectional view of the A-A section in FIG. 1 wherein the welding surface is a ring-shaped spherical surface with the center of the sphere and the electrode cap body on the same side, the bottom of the groove is a flat surface, and the bottom of the groove and the welding surface is transitioned by an arc surface.

FIG. 8 shows one embodiment of the cross-sectional view of the A-A section in FIG. 1 wherein the welding surface is a ring-shaped spherical surface with the center of the sphere and the electrode cap body on the same side, the middle of the groove is an arc-shaped boss, and the connecting part of the groove and the welding surface is transitioned by an arc surface.

Figure 9:
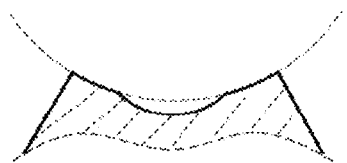
FIG. 9 shows one embodiment of the cross-sectional view of the A-A section in FIG. 1 wherein the welding surface is a ring-shaped spherical surface with the center of the sphere and the electrode cap body on the opposite side, and the groove is a spherical surface.
Figure 10:
FIG. 10 shows one embodiment of the cross-sectional view of the A-A section in FIG. 1 wherein the welding surface is a ring-shaped spherical surface with the center of the sphere and the electrode cap body on the opposite side, the bottom of the groove is a flat surface, and the bottom of the groove and the welding surface is transitioned by an arc surface.
Figure 11:
FIG. 11 shows one embodiment of the cross-sectional view of the A-A section in FIG. 1 wherein the welding surface is a ring-shaped spherical surface with the center of the sphere and the electrode cap body on the opposite side, the middle of the groove is an arc-shaped boss, and the connecting part of the groove and the welding surface is transitioned by an arc surface.
Figure 12:
FIG. 12 shows one embodiment of the cross-sectional view of the A-A section in FIG. 1 wherein the welding surface is an upward convex ring-shaped arc surface, and the groove is a spherical surface.
Figure 13:
FIG. 13 shows one embodiment of the cross-sectional view of the A-A section in FIG. 1 wherein the welding surface is an upward convex ring-shaped arc surface, the bottom of the groove is a flat surface, and the bottom of the groove and the welding surface is transitioned by an arc surface.

The reference numbers are as follows: 1—electrode cap body; 11—electrode installation channel; 12—circumference of electrode cap body; 2—side surface; 3—contact surface; 31—welding surface; 32—circumference; 4—ring-shaped ridge; 41—one ring-shaped ridge in Embodiment 2; 42—another ring-shaped ridge in Embodiment 2; 43—slot; 44—ring-shaped ridge cross section; 45—points on the side of annular ridge 41; 46—points on the side of annular ridge 42; 5—welding gun; 51—first welding gun arm; 52—second welding gun arm; 53—first welding electrode cap; 54—second welding electrode cap; 6 and 7—welding workpieces; 8—welding nugget zone between welding workpieces 6 and 7; 9—nugget; $d_1$—diameter of circle 12; $d_2$—diameter of circle 32; $d_3$—the size of outer diameter of the groove; when the groove is spherical; $d_4$—the distance between two adjacent ring-shaped ridges; $d_5$—the width of the ring-shaped ridge; h—the depth of the groove; and H—convex height H of the ring-shaped ridge.

DETAILED DESCRIPTION

Based on an extensive and intensive research and after a large number of experiments, the inventors have discovered an electrode cap with a groove in the center of the contact surface, which can solve the problems of resistance spot welding of aluminum alloy such as a required large welding current, serious welding spatter, relatively lower welding strength, low electrode life and so on. The inventors have completed the present invention based on this discovery.

The present invention will be further described below in conjunction with specific embodiments. It should be understood that these embodiments are only used to illustrate the present invention and not to limit the scope of the present invention. In addition, the figures are schematic diagrams, so the devices and equipments of the present invention are not limited by the size or ratio of the schematic diagrams.

It should be noted that in the claims and specification of this patent, the relational terms such as first and second, etc. are only configured to distinguish one entity or operation from another entity or operation, and do not necessarily require or imply any such actual relationship or order between these entities or operations. Furthermore, the terms "comprise" or "comprising" or "include" or any other variations thereof are intended to encompass a non-exclusive inclusion, such that a process, method, article, or equipment comprising a plurality of elements includes not only those elements, but also other elements which are not definitely listed, or elements inherent to the process, method, article, or equipment. Without more limitations, the element defined by the phrase "comprising one" does not exclude additional same elements existing in the process, method, article, or equipment comprising the element.

Embodiment 1

As shown in FIGS. 1-2, the electrode cap for resistance spot welding of this embodiment comprises a substantially cylindrical electrode cap body 1 and a contact surface 3 between the electrode and the welding metal material. The body 1 has an electrode mounting channel 11 at one end, and a circumference 12 at the other end. The contact surface 3 includes the welding surface 31, the circumference 32, and the groove 33. The groove 33 is located in the central area of the contact surface 3. The electrode cap further comprises a side surface 2, which is a transition area where the circumference 12 of the body 1 transitions to the circumference 32 of the contact surface 3. The shape of the side surface 2 is an arc surface, and it should be noted that the shape of the side surface 2 may also be a cone. When the side surface 2 is an arc surface, the radius of curvature of the arc surface is greater than or equal to the circumferential radius of the electrode cap body 1; when the side surface 2 is a tapered surface, the inclination angle of the tapered surface is 0-90°, preferably, 10-80°. The upper surface of the side surface 2 is a part contacting the groove, and the lower surface of the side surface 2 is a part contacting the body 1. It should be noted that when the diameter of the circumference 12 is the same as the diameter of the circumference 32, the side surface 2 becomes one part of the electrode cap body 1. It should be noted herein that the diameter of the circumference 12 is the diameter of the electrode cap body 1, and the radius of the circumference 12 is the radius of the electrode cap body 1. The side surface 2 can also have other suitable shapes.

One end of the body 1 refers to the end connected to the resistance spot welding machine during resistance spot welding, and the other end of the body 1 refers to the end close to the contact surface of the welding workpieces.

In another preferred example, the shape of the electrode mounting channel 11 is a truncated cone or cylindrical shape, and the shape of the electrode mounting channel 11 can also be some other suitable shapes.

The circumference 32 and the circumference 12 are parallel. The circumference 32 can be understood as a circumference whose diameter changes after the circumference 12 is translated upwards along the axis perpendicular to the body 1. The line connecting the center of the circumference 32 and the center of the circumference 12 coincides with the axis of the body 1. The diameter $d_2$ of the circumference 32 is less than or equal to the diameter $d_1$ of the circumference 12.

The groove 33 can be understood as a hole with a certain shape dug in the middle of the contact surface 3 and the hole extends downward for a certain distance. The shape of the groove 33 is an arc surface; or the middle of the groove 33 is a flat surface, and the contact part of the groove 33 and the ring-shaped welding surface 31 is an arc surface; or the middle of the groove 33 is an arc-shaped boss, and the contact part of the groove 33 and the welding surface 31 is an arc surface. The depth of the groove 33 is 0.1-2 mm; and preferably, 0.1-1.2 mm. The depth of the groove 33 referred herein is the vertical distance from the plane where the edge, on which the upper part of the groove 33 is in contact with the welding surface 31, is located to the plane where the bottom of the groove 33 is located.

In another preferred example, the shape of the groove 33 is a spherical surface, and when the shape of the groove 33 is a spherical surface, its outer diameter $d_3$ is 2-15 mm; and preferably, 4-12 mm.

The welding surface 31 is a ring-shaped plane, or a ring-shaped spherical surface with the center of the sphere and the electrode cap body on the same side, or a ring-shaped spherical surface with the center of the sphere and the electrode cap body on the opposite side, or an upward convex ring-shaped arc surface.

The center of the sphere and the electrode cap body on the same side and the center of the sphere and the electrode cap body on the different side refer that with the welding surface 31 as the critical surface, the direction of the center of the sphere approaching toward the electrode cap body 1 is the direction where the center of the sphere and the electrode cap body are on the same side, and the direction of the center of the sphere away from the electrode cap body 1 is the direction where the center of the sphere and the electrode cap body are on the opposite side.

When the welding surface 31 is a ring-shaped plane, its outer diameter range, that is, the diameter of the circumference 32 is 2-30 mm, and preferably, 5-20 mm. When the welding surface 31 is a ring-shaped spherical surface, the radius of the sphere where the welding surface 31 is located is 10-100 mm. When the welding surface 31 is an upward convex ring-shaped arc surface, the radius of curvature of the arc is 1-10 mm, and the vertical distance between the plane where the highest point of the arc surface is located and the plane where the lowest point of the arc surface is located is 0.1-5 mm.

Figure 14:
FIG. 14 one embodiment of the cross-sectional view of the A-A section in FIG. 1 wherein the welding surface is an upward convex ring-shaped arc surface, the middle of the groove is an arc-shaped boss, and the connecting part of the groove and the welding surface is transitioned by an arc surface.

FIGS. 3-14 show the various embodiments of the cross-sectional view of the A-A section in FIG. 1, when the shapes of the welding surface 31 and the groove 33 are combined. The cross-sectional view of the A-A section in FIG. 1 can be any of the following combinations. For example, the welding surface is a ring-shaped plane, the groove is a spherical surface (FIG. 3); or the welding surface is a ring-shaped plane, the bottom of the groove is a flat surface, and the bottom of the groove and the welding surface is transitioned by an arc surface (FIG. 4); or the welding surface is a ring-shaped plane, the middle of the groove is an arc-shaped boss, and the connecting part of the groove and the welding surface is transitioned by an arc surface (FIG. 5); or the welding surface is a ring-shaped spherical surface with the center of the sphere and the electrode cap body on the same side, and the groove is a spherical surface (FIG. 6); or the welding surface is a ring-shaped spherical surface with the center of the sphere and the electrode cap body on the same side, the bottom of the groove is a flat surface, and the bottom of the groove and the welding surface is transitioned by an arc surface (FIG. 7); or the welding surface is a ring-shaped spherical surface with the center of the sphere and the electrode cap body on the same side, the middle of the groove is an arc-shaped boss, and the connecting part of the groove and the welding surface is transitioned by an arc surface (FIG. 8); or the welding surface is a ring-shaped spherical surface with the center of the sphere and the electrode cap body on the opposite side, and the groove is a spherical surface (FIG. 9); or the welding surface is a ring-shaped spherical surface with the center of the sphere and the electrode cap body on the opposite side, the bottom of the groove is a flat surface, and the bottom of the groove and the welding surface is transitioned by an arc surface (FIG. 10); or the welding surface is a ring-shaped spherical surface with the center of the sphere and the electrode cap body on the opposite side, the middle of the groove is an arc-shaped boss, and the connecting part of the groove and the welding surface is transitioned by an arc surface (FIG. 11); or the welding surface is an upward convex ring-shaped arc surface, and the groove is a spherical surface (FIG. 12); or the welding surface is an upward convex ring-shaped arc surface, the bottom of the groove is a flat surface, and the bottom of the groove and the welding surface is transitioned by an arc surface (FIG. 13); or the welding surface is an upward convex ring-shaped arc surface, the middle of the groove is an arc-shaped boss, and the connecting part of the groove and the welding surface is transitioned by an arc surface (FIG. 14).

It is understood that the electrode cap in the present invention can be made of any conductive and thermally conductive materials, such as copper alloy, including copper chromium (CuCr) alloy, copper chromium zirconium (CuCrZr) alloy, copper alloy with alumina particles or various other copper alloys useful as electrode materials. The aforementioned aluminum alloys may include wrought aluminum alloy or cast aluminum alloy, including aluminum alloy substrates with coated or uncoated surfaces, such as aluminum-magnesium alloy, aluminum-silicon alloy, aluminum-magnesium-silicon alloy, aluminum-zinc alloy, aluminum-copper alloy, etc. Further, the material state can include various tempering, including annealing, strain strengthening, solid solution strengthening and other states. The thickness of aluminum substrate is generally between 0.3 mm and 6.0 mm, and preferably between 0.5 mm and 3.0 mm.

Embodiment 2

Figure 15:
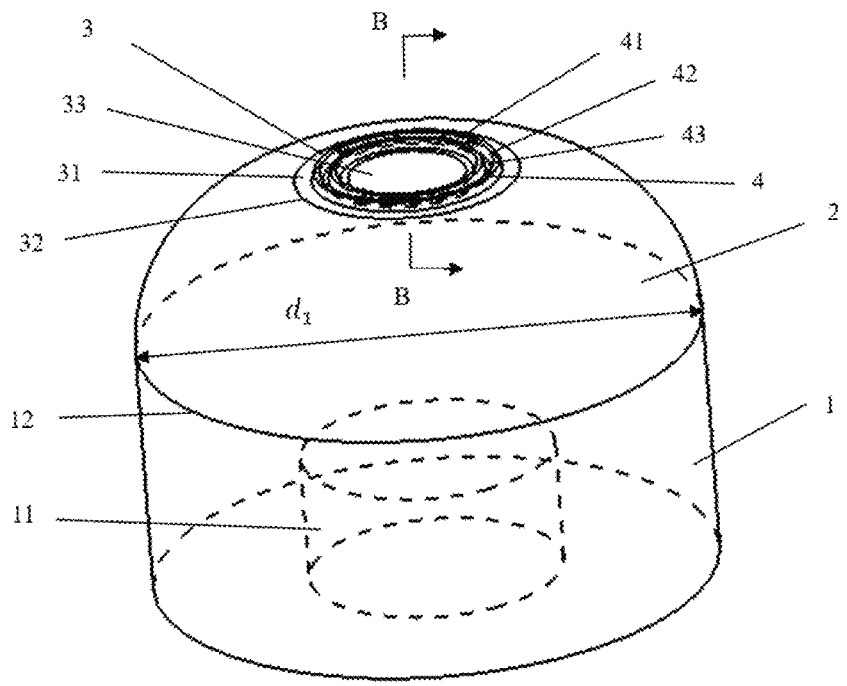
FIG. 15 shows a schematic diagram of one electrode cap with a groove in the center of the contact surface and ring-shaped ridges on the welding surface.
Figure 16:
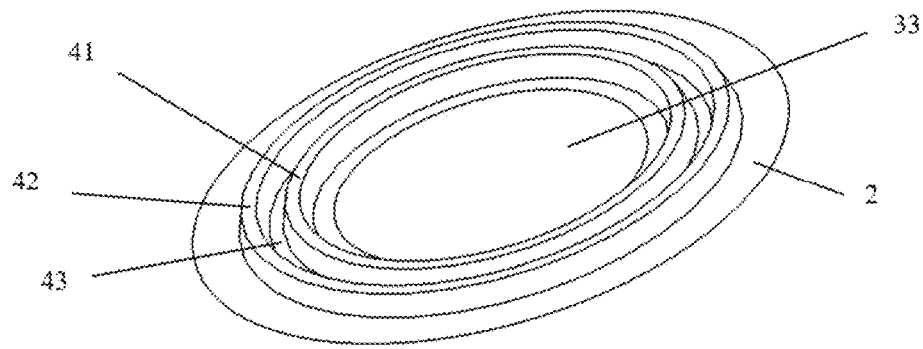
FIG. 16 shows an enlarged view of the area of the welding surface of the electrode cap in FIG. 15.

The electrode cap for resistance spot welding of this embodiment is similar to that of Embodiment 1, except that the welding surface 31 or groove 33 of this embodiment has a convex ring-shaped ridge 4, and a slot 43 is formed between two adjacent ring-shaped ridges, as shown in FIGS. 15-16. The ring-shaped ridge 4 can be understood as an annular structure formed by a plane with a certain structure of cross section 44 rotating around the central axis of the electrode cap, wherein the lower of the cross section 44 is in contact with the welding surface 31, and the entire cross section 44 is perpendicular to the welding surface 31. The central axis of the electrode cap is a straight line passing through the center of the circumference 12 and perpendicular to the circumference 12. It should be noted that the number of the annular ridges is not limited to two, and can be one or more as required.

Figure 17:
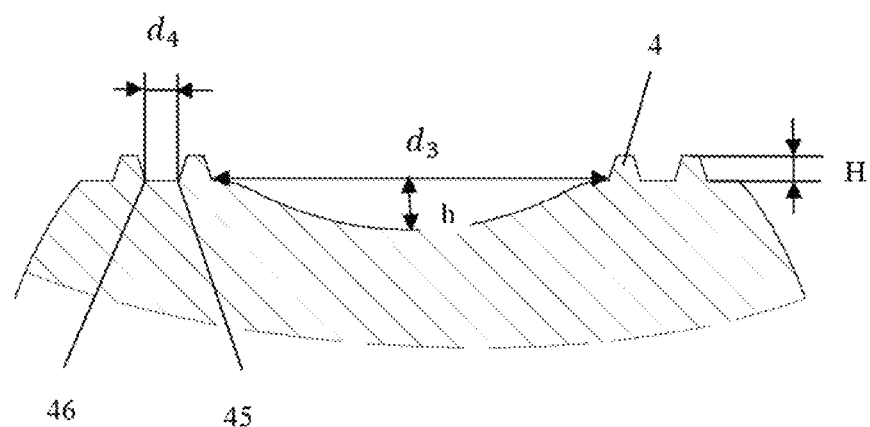
FIG. 17 shows one embodiment of a partial cross-sectional view of the B-B section in FIG. 15.
Figure 18:
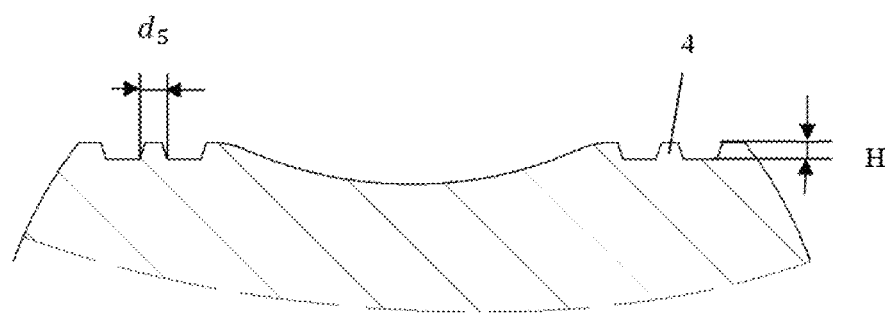
FIG. 18 shows another embodiment of the cross-sectional view of the B-B section in FIG. 15.
Figure 19:
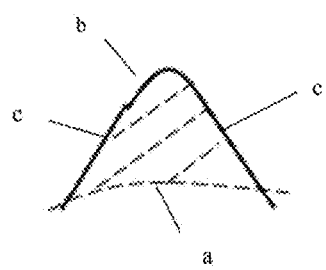
FIG. 19 shows one embodiment of the cross-sectional shape of a ring-shaped ridge, wherein the both sides are straight lines, and the top is an arc tangent to the straight lines on both sides.
Figure 20:
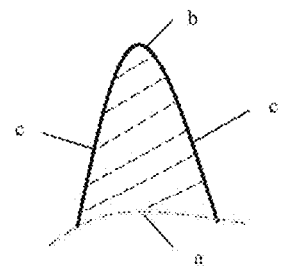
FIG. 20 shows one embodiment of the cross-sectional shape of a ring-shaped ridge, wherein the both sides are symmetrical curves, and the top is an arc tangent to the curves on both sides.
Figure 21:
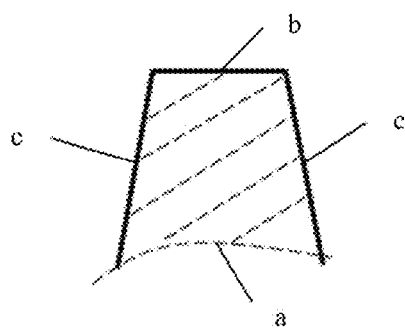
FIG. 21 shows one embodiment of the cross-sectional shape of a ring-shaped ridge, wherein the top and the both sides are straight lines.
Figure 22:
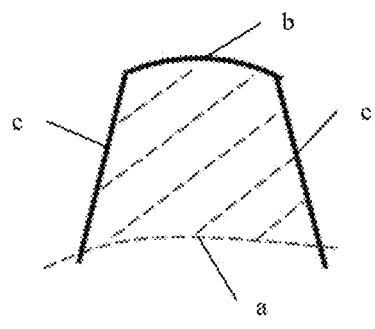
FIG. 22 shows one embodiment of the cross-sectional shape of a ring-shaped ridge, wherein the both sides are straight lines, and the top is an arc that intersects the straight lines on both sides.
Figure 23:
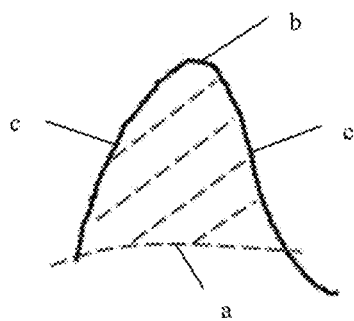
FIG. 23 shows one embodiment of the cross-sectional shape of a ring-shaped ridge, wherein the both sides are different curves, and the top is a curve connected to the curves on both sides.
Figure 24:
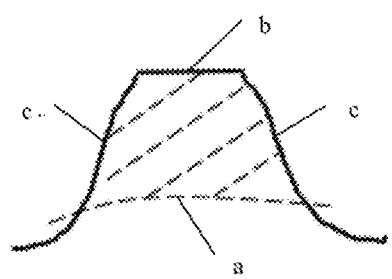
FIG. 24 shows one embodiment of the cross-sectional shape of a ring-shaped ridge, wherein the both sides are symmetrical curves, and the top is a straight line.
Figure 25:
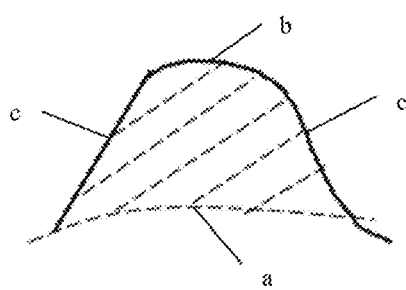
FIG. 25 shows one embodiment of the cross-sectional shape of a ring-shaped ridge, wherein one side is a straight line, the other side is a curve, and the top is a curve or a straight line.

As shown in FIGS. 17-18, the convex ring-shaped ridge 4 has two convex ways on the welding surface 31 as shown in FIGS. 17-18. The convex height H of the ring-shaped ridge 4 relative to the welding surface 31 can be 20-500 μm. The convex height mentioned herein refers to the vertical distance H from the lower portion to the top of the ring-shaped ridge 4 in the direction perpendicular to the welding surface 31 or the surface of the groove. The width $d_4$ of the slot 43 formed by the interval between two adjacent ring-shaped ridges, that is, the distance between two ring-shaped ridges is 50-3000 μm. The width $d_4$ of the slot 43 between two adjacent ring-shaped ridges mentioned here refers to the distance between two points 45 and 46 on two adjacent ring-shaped ridges 41 and 42 respectively, wherein the points 45 and 46 are located on the two adjacent side surfaces of the ring-shaped ridges 41 and 42, and the connecting line between the two points is parallel to the welding surface 31, when the partial cross-sectional view of the electrode cap with ring-shaped ridges is shown in FIG. 17. The width $d_5$ of the ring-shaped ridge can be 200-3000

μm, or more preferably 500-2000 μm. The width $d_5$ of the ring-shaped ridge described herein refers to the distance between two points located on the two side surfaces of the same ring-shaped ridge, wherein the two points are located on the same cross section of the ring-shaped ridge. It should be noted that when the number of ring-shaped ridges is three or more, the width $d_4$ of the slot between two adjacent ring-shaped ridges can be the same or different, and the width $d_5$ of each ring-shaped ridge can be the same or different.

Figure 26:
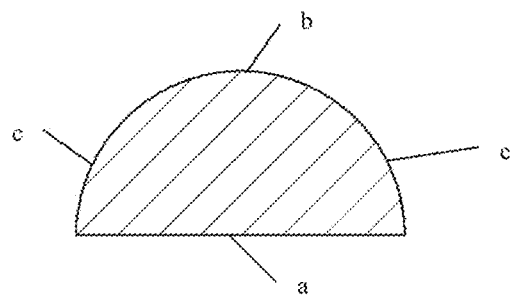
FIG. 26 shows one embodiment of the cross-sectional shape of a ring-shaped ridge, wherein entire cross-section is arc-shaped.
Figure 27:
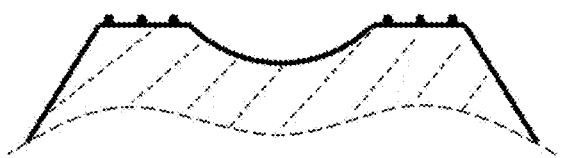
FIG. 27 shows one embodiment of a cross-sectional view of the B-B section in FIG. 15, wherein when the welding surface is a ring-shaped plane and the groove is a spherical surface, and the ring-shaped ridges are located on the welding surface.
Figure 28:
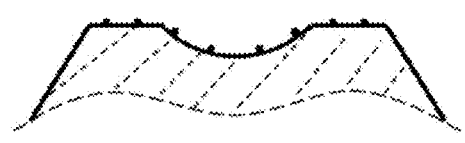
FIG. 28 shows one embodiment of a cross-sectional view of the B-B section in FIG. 15, wherein when the welding surface is a ring-shaped plane and the groove is a spherical surface, the ring-shaped ridges are located on both the welding surface and the groove.
Figure 29:
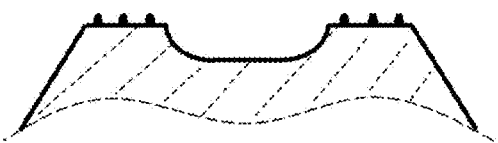
FIG. 29 shows one embodiment of a cross-sectional view of the B-B section in FIG. 15, wherein when the welding surface is a ring-shaped plane, the bottom of the groove is a flat surface, and the bottom of the groove and the welding surface is transitioned by an arc surface, the ring-shaped ridges are located on the welding surface.
Figure 30:
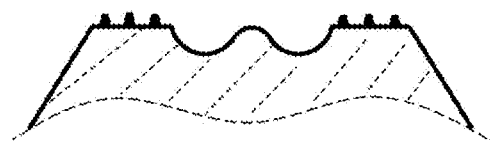
FIG. 30 shows one embodiment of a cross-sectional view of the B-B section in FIG. 15, wherein when the welding surface is a ring-shaped plane, the middle of the groove is an arc-shaped boss, and the connecting part of the groove and the welding surface is transitioned by an arc surface, the ring-shaped ridges are located on the welding surface.
Figure 31:
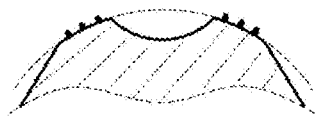
FIG. 31 shows one embodiment of a cross-sectional view of the B-B section in FIG. 15, wherein when the welding surface is a ring-shaped spherical surface with the center of the sphere and the electrode cap body on the same side, and the groove is a spherical surface, the ring-shaped ridges are located on the welding surface.
Figure 32:
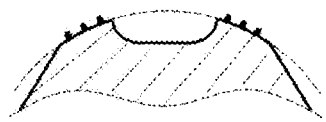
FIG. 32 shows one embodiment of a cross-sectional view of the B-B section in FIG. 15, wherein when the welding surface is a ring-shaped spherical surface with the center of the sphere and the electrode cap body on the same side, the bottom of the groove is a flat surface, and the bottom of the groove and the welding surface is transitioned by an arc surface, the ring-shaped ridges are located on the welding surface.
Figure 33:
FIG. 33 shows one embodiment of a cross-sectional view of the B-B section in FIG. 15, wherein when the welding surface is a ring-shaped spherical surface with the center of the sphere and the electrode cap body on the same side, the middle of the groove is an arc-shaped boss, and the connecting part of the groove and the welding surface is transitioned by an arc surface, the ring-shaped ridges are located on the welding surface.
Figure 34:
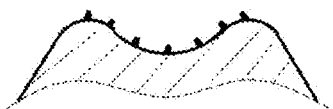
FIG. 34 shows one embodiment of a cross-sectional view of the B-B section in FIG. 15, wherein when the welding surface is an upward convex ring-shaped arc surface and the groove is a spherical surface, the ring-shaped ridges are located on both the welding surface and the groove.
Figure 35:
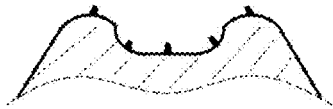
FIG. 35 shows one embodiment of a cross-sectional view of the B-B section in FIG. 15, wherein when the welding surface is an upward convex ring-shaped arc surface, the bottom of the groove is a flat surface, and the bottom of the groove and the welding surface is transitioned by an arc surface, the ring-shaped ridges are located on both the welding surface and the groove.

As shown in FIGS. 19-26, the structures of the possible shapes of the cross section 44 of the ring-shaped ridge are shown (wherein a represents the lower portion of the cross section, b represents the top of the cross section, and c represents both sides of the cross section). The cross section 44 may have structures of the following shapes. For example, the both sides are straight lines, and the top is an arc tangent to the straight lines on both sides (FIG. 19), or the both sides are symmetrical curves, and the top is an arc tangent to the curves on both sides (FIG. 20), or the top and the both sides are straight lines (FIG. 21), or the both sides are straight lines, and the top is an arc that intersects the straight lines on both sides (FIG. 22), or the both sides are different curves, and the top is a curve connected to the curves on both sides (FIG. 23), or the both sides are symmetrical curves, and the top is a straight line (FIG. 24), or one side is a straight line, the other side is a curve, and the top is a curve or a straight line (FIG. 25), or the entire cross section is semicircular (FIG. 26). It should be noted that the structures of the cross-sectional of the ring-shaped ridge described above are only some preferred structures, and other structures suitable for the cross-sectional shape of the ring-shaped ridge may also be used.

FIGS. 27-35 show that when the shapes of the welding surface 31 and the groove 33 are different, the ring-shaped ridge is located at the position of the welding surface 31 and the groove 33. It should be noted that these figures only list some preferred positions of the ring-shaped ridges on the welding surface and grooves. The ring-shaped ridge can be located on the welding surface 31 alone or on the groove 33 alone or on the welding surface 31 and the groove 33 at the same time, and the number of ring-shaped ridges on the welding surface 31 and the groove 33 can be randomly selected based on the application.

Embodiment 3

Figure 36:
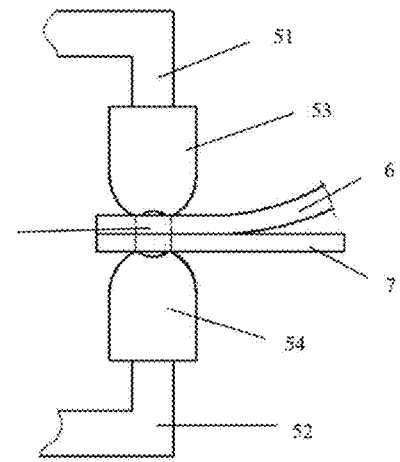
FIG. 36 shows a general side view of the metal workpieces as a whole during resistance spot welding.

This embodiment discloses the device and process for welding aluminum alloy workpieces using the electrode cap of the present invention. As shown in FIG. 36, 5 is a welding gun that can be used for resistance spot welding to connect the first aluminum alloy workpiece 6 and the second aluminum alloy workpiece 7 at the welding position 8. The welding gun 5 comprises a first welding gun arm 51, a second welding gun arm 52, a first welding electrode cap 53, and a second welding electrode cap 54. The first and second aluminum alloy workpieces 6 and 7 are composed of aluminum alloy such as aluminum-magnesium alloy, aluminum-silicon alloy, aluminum-magnesium-silicon alloy, or aluminum-copper alloy, and the thickness of the aluminum alloy workpieces is 0.5-3 mm. More preferably, the aluminum alloy workpieces may be a 2.0 millimeter (mm) thick 5182-O aluminum alloy. During welding, there can be two aluminum alloy workpieces (such as, only 6 and 7) or a combination of two or more, and the thickness of each aluminum alloy workpiece can be the same or different. It should be noted that the term "workpiece" as used herein refers to a wide range of metal sheet layers, protrusions, castings and other aluminum alloy parts or steel and magnesium alloy parts that can be resistance spot welded. Welding gun arms 51 and 52 are usually parts of a larger automated welding operation, generally including C-type, X-type and other types of structural shapes, and the welding gun arms are usually realized by robots or automated components, which are well understood in the art.

The first and second welding gun arms 51 and 52 are provided with the first and second welding electrode caps 53 and 54 as described in Embodiments 1 and 2. During spot welding, the welding gun arms are operated to make the electrode caps 53 and 54 precisely attach to the workpieces 6 and 7, and the pressure and current are conducted through the welding gun arm and the electrode cap, so that the contacting parts 8 of the workpieces 6 and 7 are melted and a spot welding joint is formed. The two electrode caps 53 and 54 may have various structures as described in Embodiments 1 and 2, and the structures of 53 and 54 may be same or different.

Figure 37:
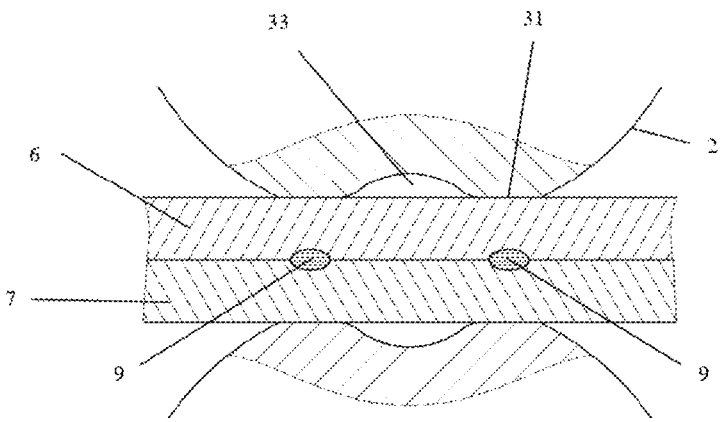
FIG. 37 shows one schematic cross-sectional view of the initial stage of welding when using the electrode cap of the present invention for welding, wherein no ring-shaped ridge is provided on the welding surface of the electrode cap.

FIG. 37 shows a schematic cross-sectional view of the initial stage of welding when the electrode cap in Embodiment 1 of the present invention is used for welding. The electrodes 53 and 54 have the same structural size. During welding, the welding guns transmit pressure and current through the welding surface 31, the area where the contact part of the two layers of metal materials 6 and 7 is affected by the ring electrode will generate resistance heat, so that a nugget 9 is formed, and then a ring-shaped molten pool is formed. Firstly, the outer sides of the two-layer metal workpieces contact with each other, and the contact parts that are affected by the ring-shaped electrode generate resistance heat and a ring-shaped molten pool is formed. As the welding time extends and the central areas contact gradually, the ring-shaped molten pool grows toward the center under the effect of heat conduction. Since the center area of the two metal workpieces corresponding to the groove (inside the spot welds) is small and not in contact with the electrode cap, the heat is concentrated on the outside. As the metal material in the contact area melts and deforms plastically, it squeezes and expands to the center groove of the electrode, a new contact surface in the center is generated and the resistance heat is generated on the new contact surface, so that the ring-shaped molten pool grows toward the ring center, and the contact parts of the two metal materials corresponding to the groove form a nugget, thereby completing the welding. Due to the presence of the groove, the initial contact area of the electrode cap of the present invention with the metal workpiece is reduced, the overall heat generation is concentrated, and the heat dissipation becomes slower. As the welding proceeds, the contact area becomes larger and the heat dissipation becomes faster. Therefore, compared with ordinary electrode caps, the welding current required to form spot welds of the same size is reduced, power costs is saved, and the electrode life is improved. Furthermore, because the ring-shaped molten pool is formed first, the presence of the central groove makes the ring-shaped molten pool grow from outside to inside, which is contrary to the growth of the ordinary electrode cap molten pool from inside to outside. The metal material in plastic state is squeezed toward the electrode center groove area under the action of pressure and current, so that it is helpful to avoid porosity, spatter and welding deformation at the edge of the spot welds, thereby increasing the diameter of the nugget and improving the strength of spot welds.

When there is a ring-shaped ridge, the ring-shaped ridge can pierce the oxide film on the surface of the aluminum alloy during contact, thereby reducing the contact resistance, increasing the contact area and enhancing heat dissipation, so that the heat of the electrode welding surface and the contact surface of the aluminum alloy plate is reduced and the service life of the electrode is improved.

Figure 38:
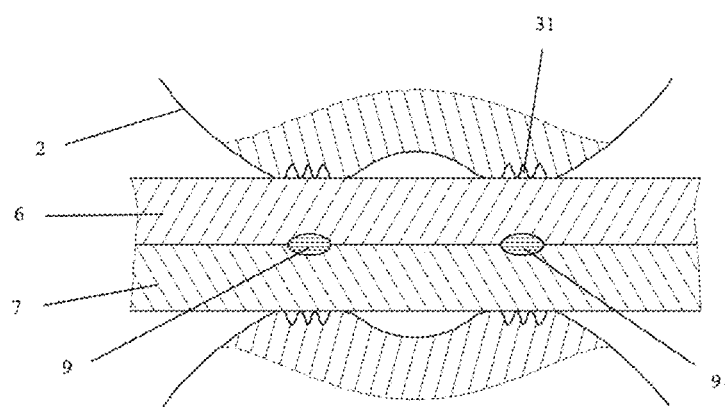
FIG. 38 shows one schematic cross-sectional view of the initial stage of welding when using the electrode cap of the present invention for welding, wherein the welding surface of the electrode cap is provided with ring-shaped ridges.

FIG. 38 shows a schematic cross-sectional view of the initial stage of welding when the electrode cap in Embodiment 2 of the present invention is used for welding. The welding principle is similar to that of FIG. 37.

Embodiment 4

Figure 39:
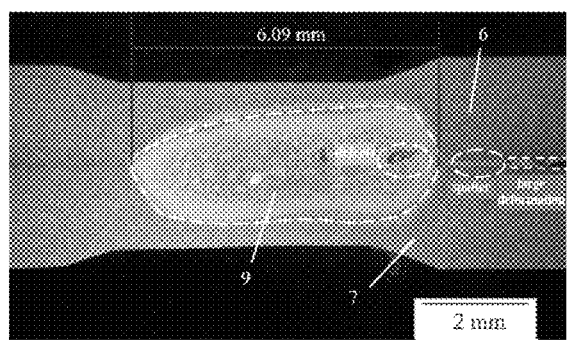
FIG. 39 shows a cross-sectional shape of the spot welds after resistance spot welding of two 5182-O aluminum alloys with a thickness of 2 mm by using a common electrode cap.

As shown in FIG. 39, it shows the cross-sectional shape of the spot welds after resistance spot welding of two pieces of 2 millimeter (mm) thick 5182-O aluminum alloy by using a common electrode cap. It can be seen from the figure that the diameter of the nugget is small and only 6.08 mm, and there are obvious shrinkage defects inside, serious spatter, and larger edge welding deformation, thereby resulting low spot welds strength.

Embodiment 5

Figure 40:
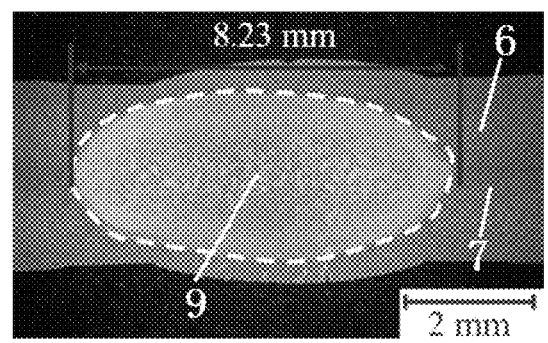
FIG. 40 shows a cross-sectional shape of the pot welds after resistance spot welding of two 5182-O aluminum alloys with a thickness of 2 mm by using the electrode cap in Embodiment 1 of the present invention.

As shown in FIG. 40, it shows that the cross-sectional shape of the spot welds of the two pieces of aluminum alloy after resistance spot welding of two pieces of 2 mm thick 5182-O aluminum alloy by using the electrode cap in Embodiment 1 of the present invention and using the welding device and welding principle of Embodiment 3. It can be seen from the figure that the diameter of the nugget has reached 8.23 mm, and there are no obvious welding defects inside, no spatter, and no obvious deformation of the edge of the spot welds, so that the strength of the spot welds is greatly improved.

Although the present invention has been disclosed as above in the preferred embodiments, they are not intended to limit the present invention, and various equivalent changes or substitutions made by any person skilled in the art without departing from the spirit and scope of the present invention shall fall within the protection scope of the present invention. Therefore, the protection scope of the present invention shall be subject to the scope defined by the appended claims of this application.

What is claimed is:

1. An electrode cap for resistance spot welding, which comprises:
   a cylindrical electrode cap body (1);
   a contact surface (3) with a welding surface (31), a circumference (32), and a groove (33), wherein the groove (33) is located in the center of the contact surface (3), a upper edge of the groove (33) is connected with the welding surface (31), and the circumference (32) is the outer diameter of the welding surface (31);
   a side surface (2) which is a transition area from the electrode cap body (1) to the contact surface (3), and has a shape of an arc surface or a tapered surface;
   wherein an upper surface and a lower surface of the side surface (2) are respectively connected with the contact surface (3) and one end of the electrode cap body (1) in the form of arc or chamfer.

2. The electrode cap for resistance spot welding of claim 1, wherein the shape of the groove (33) is an arc surface as a whole; or a bottom of the groove (33) is a flat surface, and a connecting part of the groove (33) and the welding surface (31) is transitioned by an arc surface or tapered surface; or the middle of the groove is an arc-shaped boss, and a connecting part of the groove (33) and the welding surface (31) is transitioned by an arc surface or tapered surface.

3. The electrode cap for resistance spot welding of claim 1, wherein the groove (33) has a depth h of 0.1-2 mm.

4. The electrode cap for resistance spot welding of claim 1, wherein when the groove (33) is an arc surface as a whole, a radius of curvature of the arc surface of the groove (33) is 1-50 mm; and when a bottom of the groove is a flat surface, the flat surface is a circle with a radius of 0.1-10 mm.

5. The electrode cap for resistance spot welding of claim 1, wherein the welding surface (31) is a ring-shaped plane, or a ring-shaped spherical surface with a center of the sphere and the electrode cap body on the same side, or a ring-shaped spherical surface with a center of the sphere and the electrode cap body on the opposite side, or an upward convex ring-shaped arc surface.

6. The electrode cap for resistance spot welding of claim 1, which further comprises a ring-shaped ridge (4) located on the welding surface (31) or groove (33), and a cross-sectional shape of the ring-shaped ridge (4) is a straight line, a curve or a combination of a straight line and a curve.

7. The electrode cap for resistance spot welding of claim 6, which further comprises a slot (43) formed between two adjacent ring-shaped ridges (4).

8. The electrode cap for resistance spot welding of claim 7, wherein the convex height H of the ring-shaped ridge (4) is 20-500 μm.

9. The electrode cap for resistance spot welding of claim 7, wherein the number of the ring-shaped ridge (4) is 0-5.

10. The electrode cap for resistance spot welding of claim 7, wherein the distance between two adjacent ring-shaped ridges (4) is 50-3000 μm.

11. The electrode cap for resistance spot welding of claim 1, wherein during resistance spot welding of two-layer metal workpieces, the electrode cap forms a ring-shaped molten pool which grows from outside to inside, thereby forming a nugget.

12. A method of resistance spot welding, which comprises:
   (a) providing a first aluminum alloy workpiece and a second aluminum alloy workpiece;
   (b) operating welding gun arms to make a first welding electrode cap and a second welding electrode cap contact with the first aluminum alloy workpiece and the second aluminum alloy workpiece, respectively; and
   (c) applying pressure and current through the welding gun arm and the first and second electrode caps, so that contacting parts of the first and second workpieces are melted and a spot welding joint is formed,
   wherein the first welding electrode cap and/or the second welding electrode cap is an electrode cap for resistance spot welding of claim 1.

13. The method of claim 12, wherein in step (c), during resistance spot welding of aluminum alloy workpieces, the electrode caps form a ring-shaped molten pool which grows from outside to inside, thereby forming a nugget.

14. An electrode cap for resistance spot welding, which comprises:
   a cylindrical electrode cap body (1);
   a contact surface (3) with a welding surface (31), a circumference (32), and a groove (33), wherein the groove (33) is located in the center of the contact surface (3), a upper edge of the groove (33) is connected with the welding surface (31), and the circumference (32) is the outer diameter of the welding surface (31);

a side surface (2) which is a transition area from the electrode cap body (1) to the contact surface (3), and has a shape of an arc surface or a tapered surface;

wherein an upper surface and a lower surface of the side surface (2) are respectively connected with the contact surface (3) and one end of the electrode cap body (1) in the form of arc;

which further comprises a ring-shaped ridge (4) located on the welding surface (31) or groove (33), and a cross-sectional shape of the ring-shaped ridge (4) is a straight line, a curve or a combination of a straight line and a curve.

15. The electrode cap for resistance spot welding of claim 14, wherein during resistance spot welding of two-layer metal workpieces, the electrode cap forms a ring-shaped molten pool which grows from outside to inside, thereby forming a nugget.

\* \* \* \* \*